US012639016B2

(12) United States Patent
 Kamoi

(10) Patent No.: US 12,639,016 B2
(45) Date of Patent: May 26, 2026

(54) IMAGE FORMING SYSTEM AND NON-TRANSITORY COMPUTER READABLE MEDIUM STORING PROGRAM

(71) Applicant: FUJIFILM Business Innovation Corp., Tokyo (JP)

(72) Inventor: Yusuke Kamoi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/951,083

(22) Filed: Sep. 22, 2022

(65) Prior Publication Data

US 2023/0297294 A1 Sep. 21, 2023

(30) Foreign Application Priority Data

Mar. 18, 2022 (JP) ................................. 2022-044191

(51) Int. Cl.
 *G06F 15/00* (2006.01)
 *G06F 3/12* (2006.01)
(52) U.S. Cl.
 CPC .......... *G06F 3/1204* (2013.01); *G06F 3/1212* (2013.01); *G06F 3/1237* (2013.01); *G06F 3/1278* (2013.01); *G06F 3/1238* (2013.01)
(58) Field of Classification Search
 None
 See application file for complete search history.

(56) References Cited

U.S. PATENT DOCUMENTS 10,178,255 B2 1/2019 Nobutani et al.
2009/0091775 A1* 4/2009 Yoshida ................ G06F 3/1288
                                                         358/1.15

2014/0368870 A1* 12/2014 Moritani .............. G06K 15/002
                                                          358/1.15
2015/0356563 A1* 12/2015 Vohra ..................... G06Q 20/20
                                                          705/44
2020/0137252 A1* 4/2020 Wada ................. H04N 1/00326

FOREIGN PATENT DOCUMENTS

| JP | 2001142664 | 5/2001 |
|---|---|---|
| JP | 2008117349 | 5/2008 |
| JP | 2008165540 | 7/2008 |
| JP | 2017167685 | 9/2017 |
| JP | 2018132843 | 8/2018 |

OTHER PUBLICATIONS

"Notice of Reasons for Refusal of Japan Counterpart Application", issued on Nov. 18, 2025, with English translation thereof, p. 1-p. 5.

* cited by examiner

*Primary Examiner* — Mark R Milia

(74) *Attorney, Agent, or Firm* — JCIPRNET

(57) ABSTRACT

An image forming system includes a printing management apparatus including a first processor configured to, in a case where a notification indicating that a user enters a region in which authentication of the user is necessary at entry is received, transmit printing data registered in advance by the user who has entered the region to an image forming apparatus installed in the region, and at least one image forming apparatus including a second processor and a memory, the second processor being configured to receive the printing data transmitted from the printing management apparatus, convert the printing data into a printable form, and store the converted printing data in the memory as printable data.

18 Claims, 9 Drawing Sheets

CONVENIENCE STORE

ENTERING

70

USER

PRINT
"OOO MATERIAL"

(IMAGE FORMING APPARATUS 20)

Figure 9:
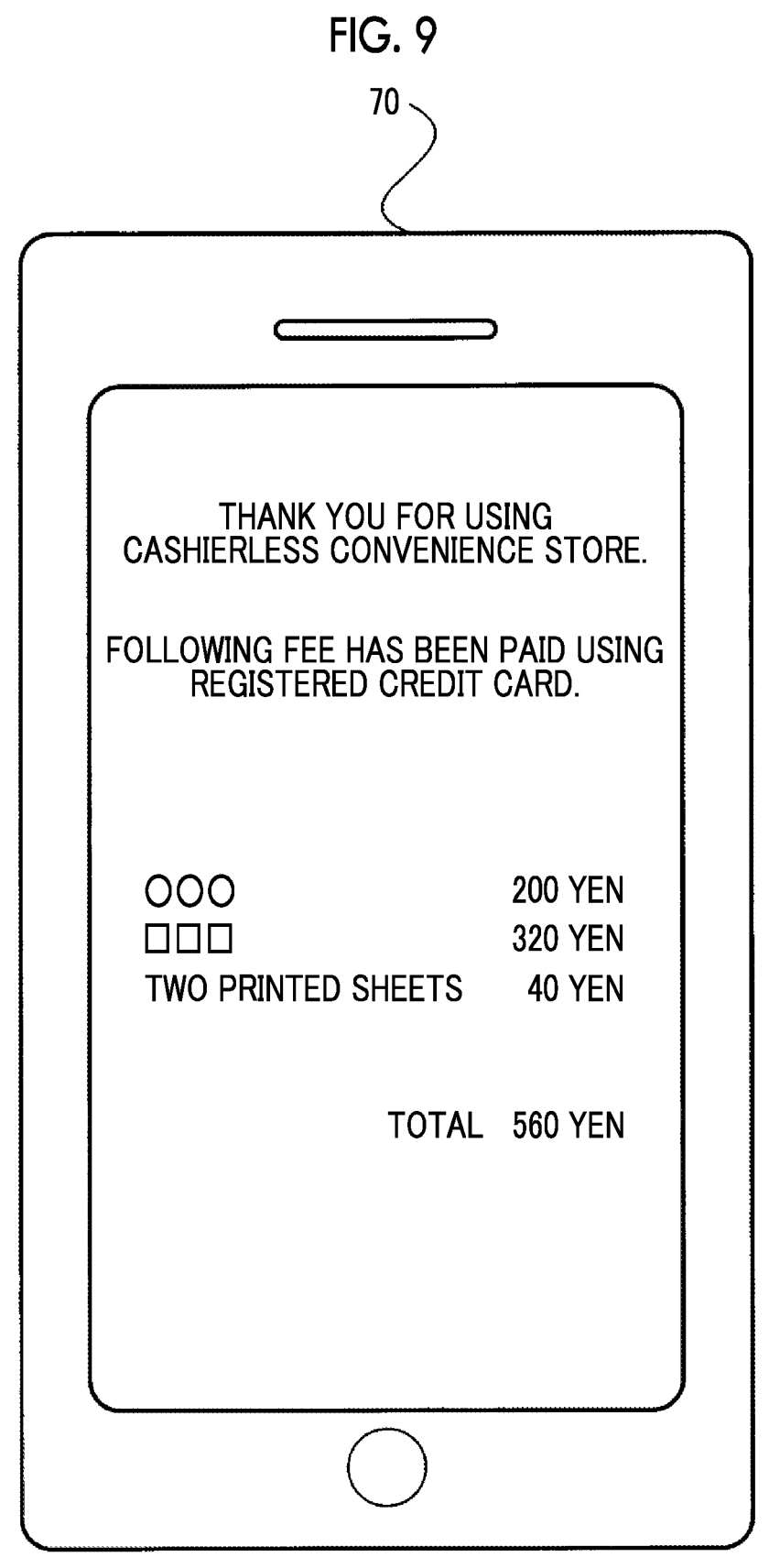

THANK YOU FOR USING
CASHIERLESS CONVENIENCE STORE.

FOLLOWING FEE HAS BEEN PAID USING
REGISTERED CREDIT CARD.

OOO     200 YEN
□□□     320 YEN
TWO PRINTED SHEETS  40 YEN

TOTAL 560 YEN

IMAGE FORMING SYSTEM AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2022-044191 filed Mar. 18, 2022.

BACKGROUND

(i) Technical Field

The present disclosure relates to an image forming system and a non-transitory computer readable medium storing a program.

(ii) Related Art

JP2008-117349A discloses an output apparatus that detects a wireless device carried by a user, acquires identification information by communicating with the wireless device, downloads a document file corresponding to the identification information from the cloud, and in a case where a print output instruction is provided by inputting a print reservation number, outputs a document file corresponding to the input print reservation number.

SUMMARY

There is a service in which a user enters a region in which authentication is necessary at a time of entry and prints printing data registered in advance by the user from an image forming apparatus installed in the region. However, in a case where the user operates the image forming apparatus after entering the region, the image forming apparatus has to download the printing data from a server apparatus or the like after the operation performed by the user, and time is taken until a printed matter is output.

Aspects of non-limiting embodiments of the present disclosure relate to an image forming system, a printing management apparatus, and a non-transitory computer readable medium storing a program that can reduce time taken until a printed matter is output in a case where a user enters a region in which user authentication is necessary at a time of entry and prints printing data registered in advance using an image forming apparatus, compared to a case where the image forming apparatus acquires the printing data after an operation of the user performed on the image forming apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming system including a printing management apparatus including a first processor configured to, in a case where a notification indicating that a user enters a region in which authentication of the user is necessary at entry is received, transmit printing data registered in advance by the user who has entered the region to an image forming apparatus installed in the region, and at least one image forming apparatus including a second processor and a memory, the second processor being configured to receive the printing data transmitted from the printing management apparatus, convert the printing data into a printable form, and store the converted printing data in the memory as printable data.

BRIEF DESCRIPTION OF THE DRAWINGS

Exemplary embodiment(s) of the present invention will be described in detail based on the following figures, wherein:

FIG. 2 is a diagram illustrating a state where a user uses a convenience store that is a cashierless store;

FIG. 7 is a diagram illustrating a state where a printing start button 81 is displayed on an operation panel 80 of the image forming apparatus 20 and the user operates the printing start button 81 to start a printing process;

FIG. 9 is a diagram illustrating a notification example of a payment process result for the user who has purchased another product together with the printing process.

DETAILED DESCRIPTION

Next, an exemplary embodiment of the present disclosure will be described in detail with reference to the drawings.

Figure 1:
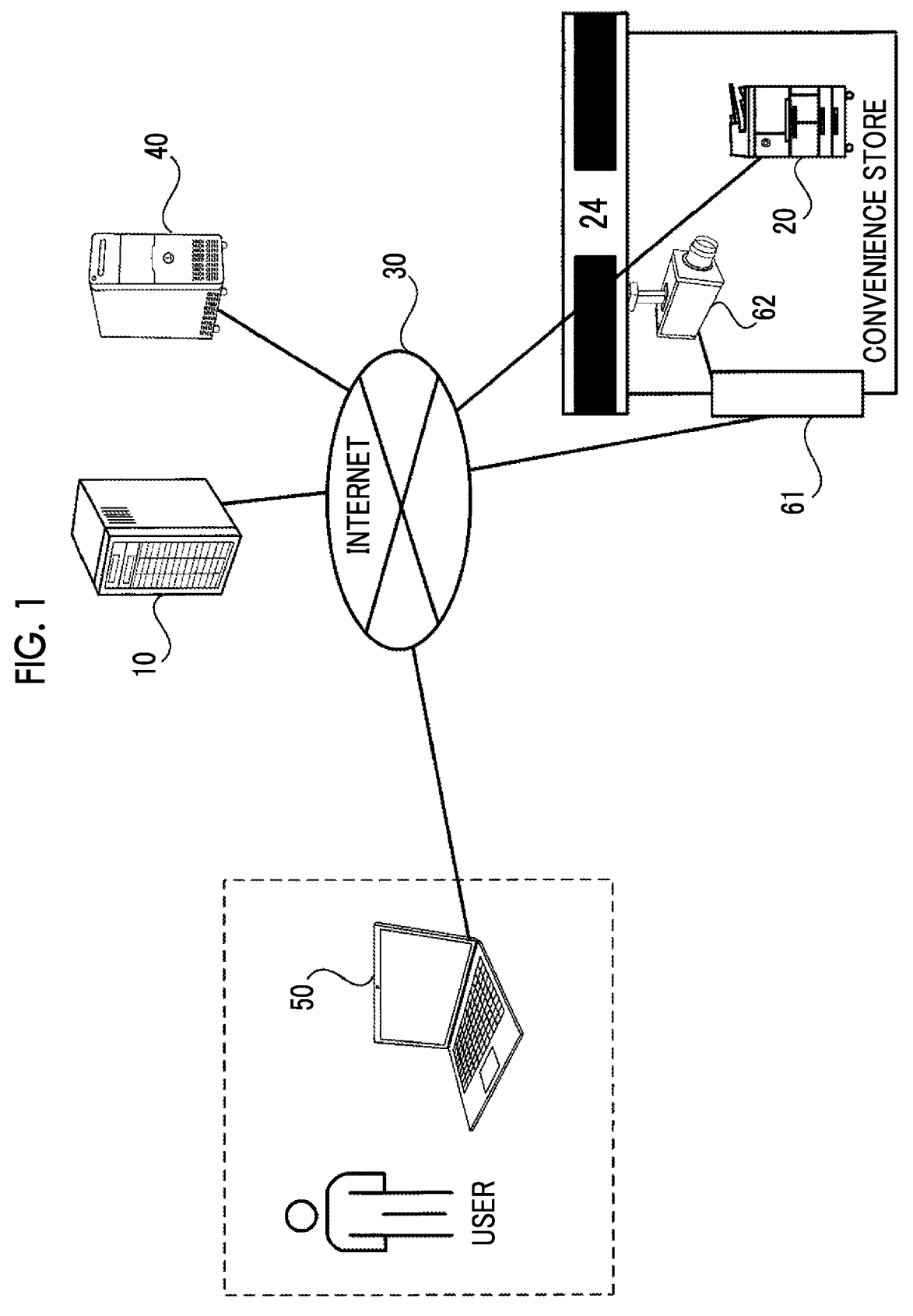
FIG. 1 is a diagram illustrating a system configuration of an image forming system of an exemplary embodiment of the present disclosure.

FIG. 1 is a diagram illustrating a system configuration of an image forming system of the exemplary embodiment of the present disclosure.

The image forming system of the present exemplary embodiment is configured by connecting an image forming apparatus 20 installed in a store such as a convenience store, a printing management server 10, and a terminal device 50 at home of a user via an Internet 30 as illustrated in FIG. 1. In the description of the present exemplary embodiment, at least one image forming apparatus 20 is assumed to be arranged in the store that is a convenience store. In the image forming system of the present exemplary embodiment, first, the user who is a person using the image forming system registers printing data to be printed in advance in the printing management server 10 that is a printing management apparatus from the terminal device 50. The user goes to an installation location of the image forming apparatus 20, downloads the printing data registered in the printing management server 10, and prints the printing data. The image forming apparatus 20 in the present exemplary embodiment is an apparatus referred to as a so-called multifunction peripheral having a plurality of functions such as a printing function, a scanning function, a copying function, and a facsimile function.

The convenience store in which the image forming apparatus 20 in the image forming system of the present exemplary embodiment is installed is a cashierless store in which a cashier for the user to pay a price of a product is not present.

In the cashierless store, an accounting procedure for paying the price of the purchased product is not necessary for the user, and payment is completed by simply picking up a product displayed in the store and leaving the store.

In order to implement this cashierless payment system, an entry gate apparatus 61 is installed at an entrance of the convenience store, and a plurality of cameras 62 are installed in the store. The cashierless payment system is configured by connecting the entry gate apparatus 61 and the plurality of cameras 62 to the cashierless payment server 40 via the Internet 30.

Figure 2:
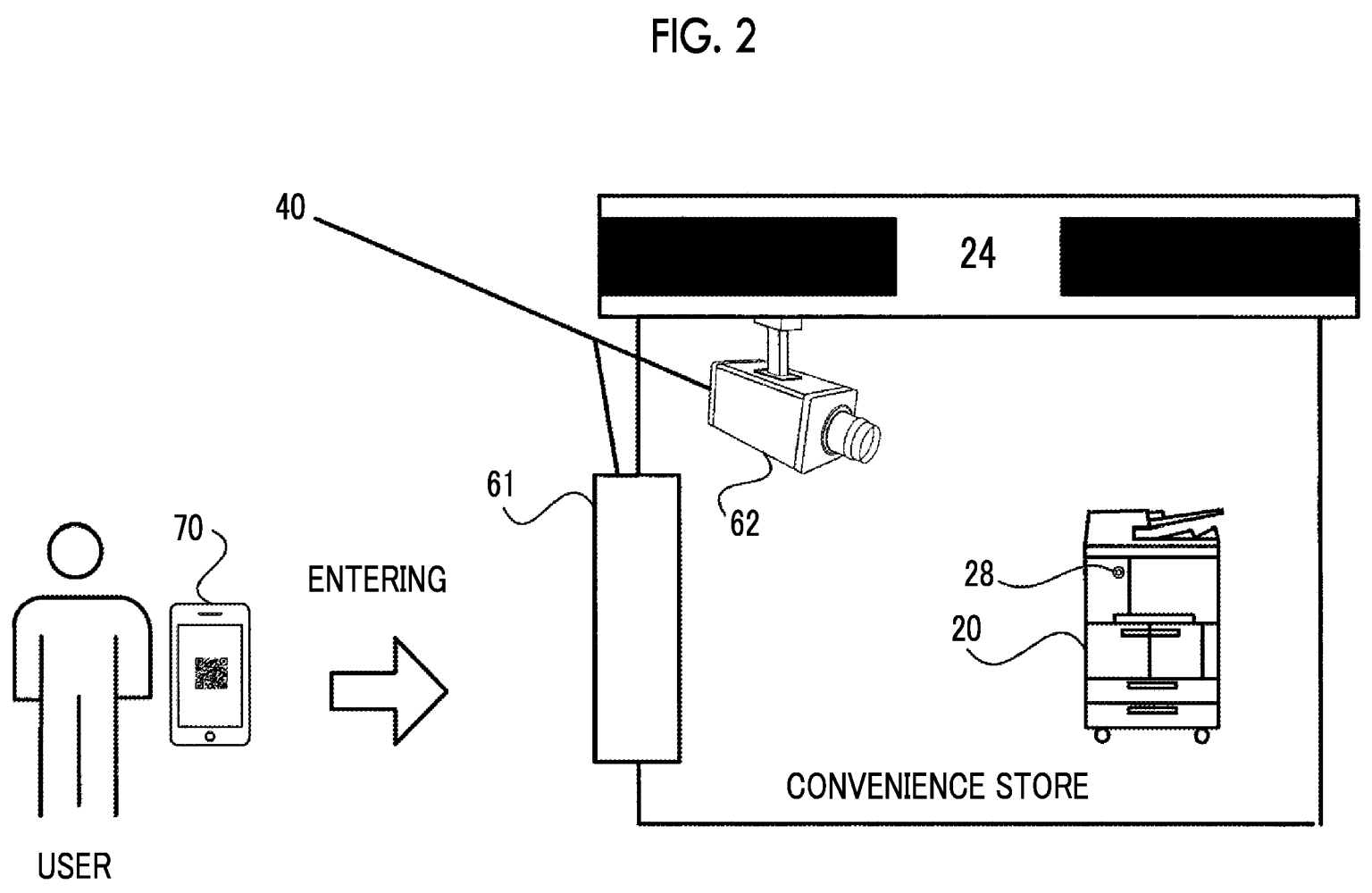

FIG. 2 illustrates a state where the user uses the convenience store that is a cashierless store. In using the convenience store that is a cashierless store, the user installs an application program (hereinafter, abbreviated to an app) for cashierless payment in advance on a portable terminal device 70 such as a smartphone. FIG. 2 illustrates a state where the user displays, for example, a QR code (registered trademark) on a display of the portable terminal device 70 and presents the QR code to the entry gate apparatus 61 to be authenticated and then, enters the store.

In a case where the user enters the convenience store, the cashierless payment server 40 is notified of the entry of the user to the store. A determination as to which product is picked up by the user is performed by imaging an action of the user who has entered the convenience store using the plurality of cameras 62 installed in the store and transmitting a captured video to the cashierless payment server 40.

In a case where a determination that the user leaves the convenience store is made based on the video captured by the cameras 62, the cashierless payment server 40 performs a payment process based on a credit card number registered in advance by the user. Then, this payment process result is transmitted to the portable terminal device 70 held by the user, and the user can be informed of the payment process result.

The image forming apparatus 20 illustrated in FIG. 2 is provided with a camera 28 and is configured to capture a face image of the user who approaches the image forming apparatus 20. A method of using the camera 28 will be described later.

In network printing via a network in the related art, authentication information such as a reservation number is issued in a case where a user uploads printing data to a printing management server, and a printing process is executed by inputting the reservation number into an image forming apparatus installed in a store such as a convenience store. In this case, in a case where the user pays a fee with cash, electronic money, or the like by inputting the reservation number into the image forming apparatus installed in the store, the printing process is executed after the printing data is downloaded to the image forming apparatus from the printing management server and the printing data is converted into image data of a raster form.

However, in the image forming apparatus 20 installed in the convenience store that is a cashierless payment store as described above, paying a printing fee with cash or requiring an input of the reservation number for executing the printing process decreases worth of introduction of the cashierless payment system.

In addition, in a case where the user operates the image forming apparatus after entering the store, the image forming apparatus has to download the printing data from the server apparatus or the like such as the printing management server after the operation performed by the user, and time is taken until a printed matter is output.

For the image forming apparatus installed in the region such as a cashierless store, enabling acquisition of the printed matter in the same sense as purchase of another product is required. Specifically, a system that causes the user who has entered the store to acquire the printed matter in a short time by simply performing a simple operation or without an operation and complete the payment process by simply leaving after acquiring the printed matter is required.

Therefore, in the image forming system of the present exemplary embodiment, the printing management server 10 and the image forming apparatus 20 implement the acquisition of the printed matter in the same sense as the purchase of the product in the cashierless store by performing a control in connection with the cashierless payment server 40 to reduce time taken from the entry of the user until the output of the printed matter and reduce an effort of operation for the user.

Figure 3:
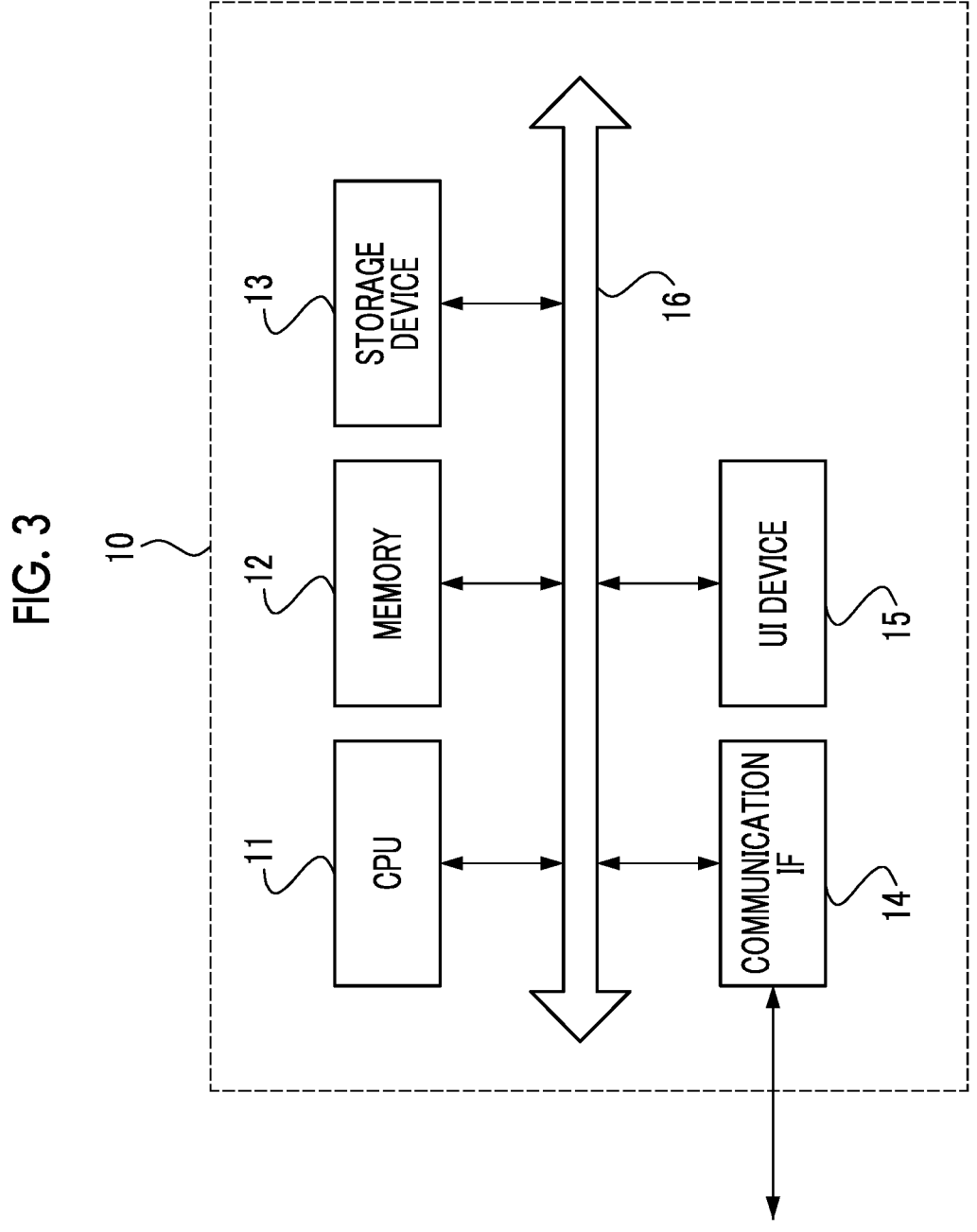
FIG. 3 is a block diagram illustrating a hardware configuration of a printing management server 10 in the exemplary embodiment of the present disclosure.

Next, a hardware configuration of the printing management server 10 in the image forming system of the present exemplary embodiment is illustrated in FIG. 3.

As illustrated in FIG. 3, the printing management server 10 includes a CPU 11, a memory 12, a storage device 13 such as a hard disk drive, a communication interface (abbreviated to IF) 14 that transmits and receives data to and from an external apparatus or the like via the Internet 30, and a user interface (abbreviated to UI) device 15 including a touch panel or a liquid crystal display and a keyboard. These constituents are connected to each other via a control bus 16.

The CPU 11 is a processor that controls an operation of the printing management server 10 by executing a predetermined process based on a control program stored in the memory 12 or the storage device 13. In the present exemplary embodiment, while the CPU 11 scans and executes the control program stored in the memory 12 or the storage device 13, the present disclosure is not limited thereto. The control program may be provided in the form of a recording on a computer readable recording medium. For example, this program may be provided in the form of a recording on an optical disc such as a compact disc (CD)-ROM and a digital versatile disc (DVD)-ROM or in the form of a recording on a semiconductor memory such as a universal serial bus (USB) memory and a memory card. In addition, the control program may be acquired from an external apparatus via a communication line connected to the communication interface 14.

Figure 4:
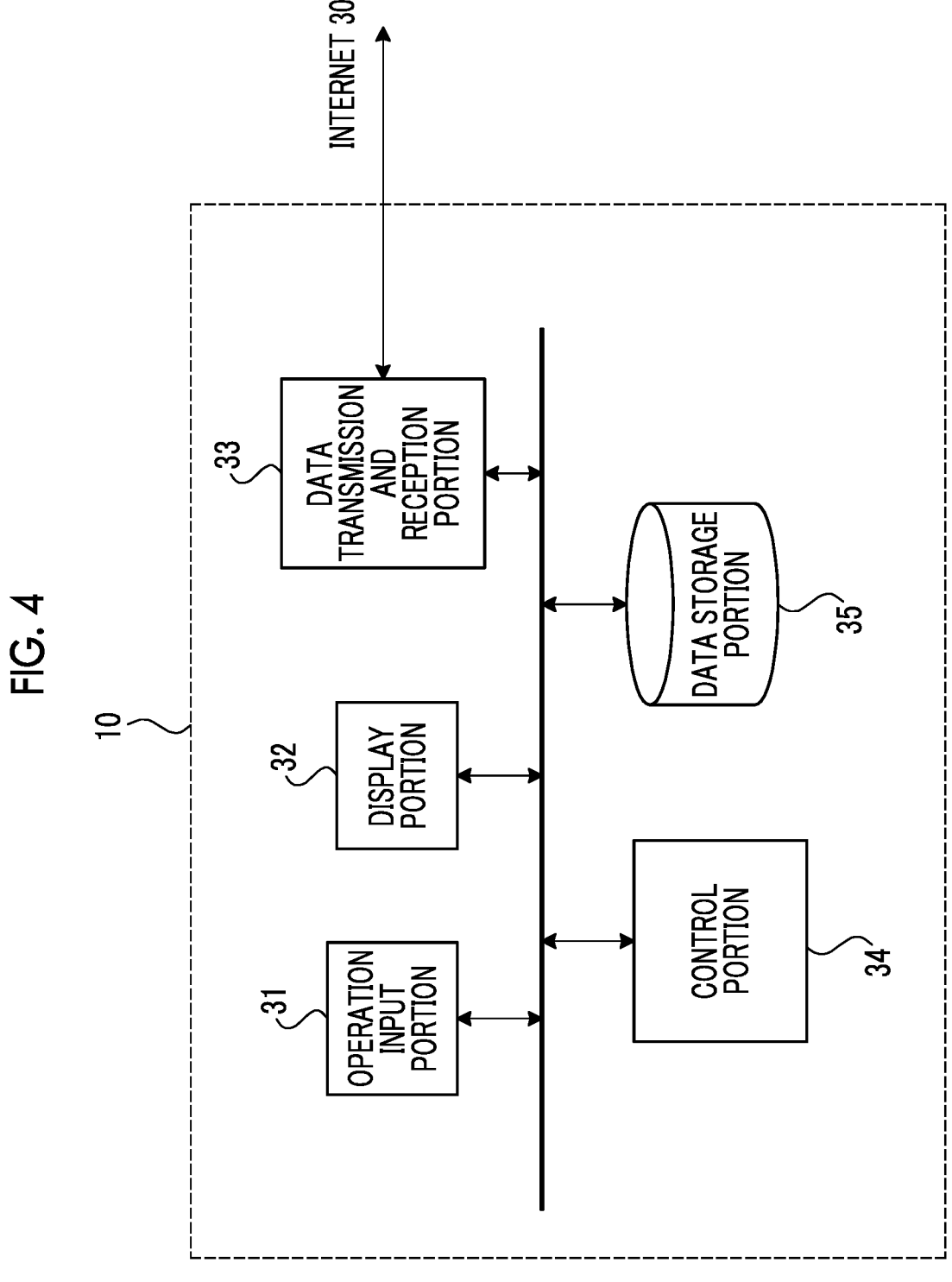
FIG. 4 is a block diagram illustrating a functional configuration of the printing management server 10 in the exemplary embodiment of the present disclosure.

FIG. 4 is a block diagram illustrating a functional configuration of the printing management server 10 implemented by executing the control program.

As illustrated in FIG. 4, the printing management server 10 of the present exemplary embodiment includes an operation input portion 31, a display portion 32, a data transmission and reception portion 33, a control portion 34, and a data storage portion 35.

The data transmission and reception portion 33 transmits and receives data to and from an external apparatus such as the terminal device 50 of the user, the image forming apparatus 20, and the cashierless payment server 40 via the Internet 30.

The display portion 32 is controlled by the control portion 34 and displays various information to the user. The operation input portion 31 inputs information about various operations performed by the user.

The control portion 34 implements network printing by receiving and storing the uploaded printing data in the data storage portion 35 from the terminal device 50 via the data transmission and reception portion 33 and transmitting the stored printing data to the image forming apparatus 20.

Figure 5:
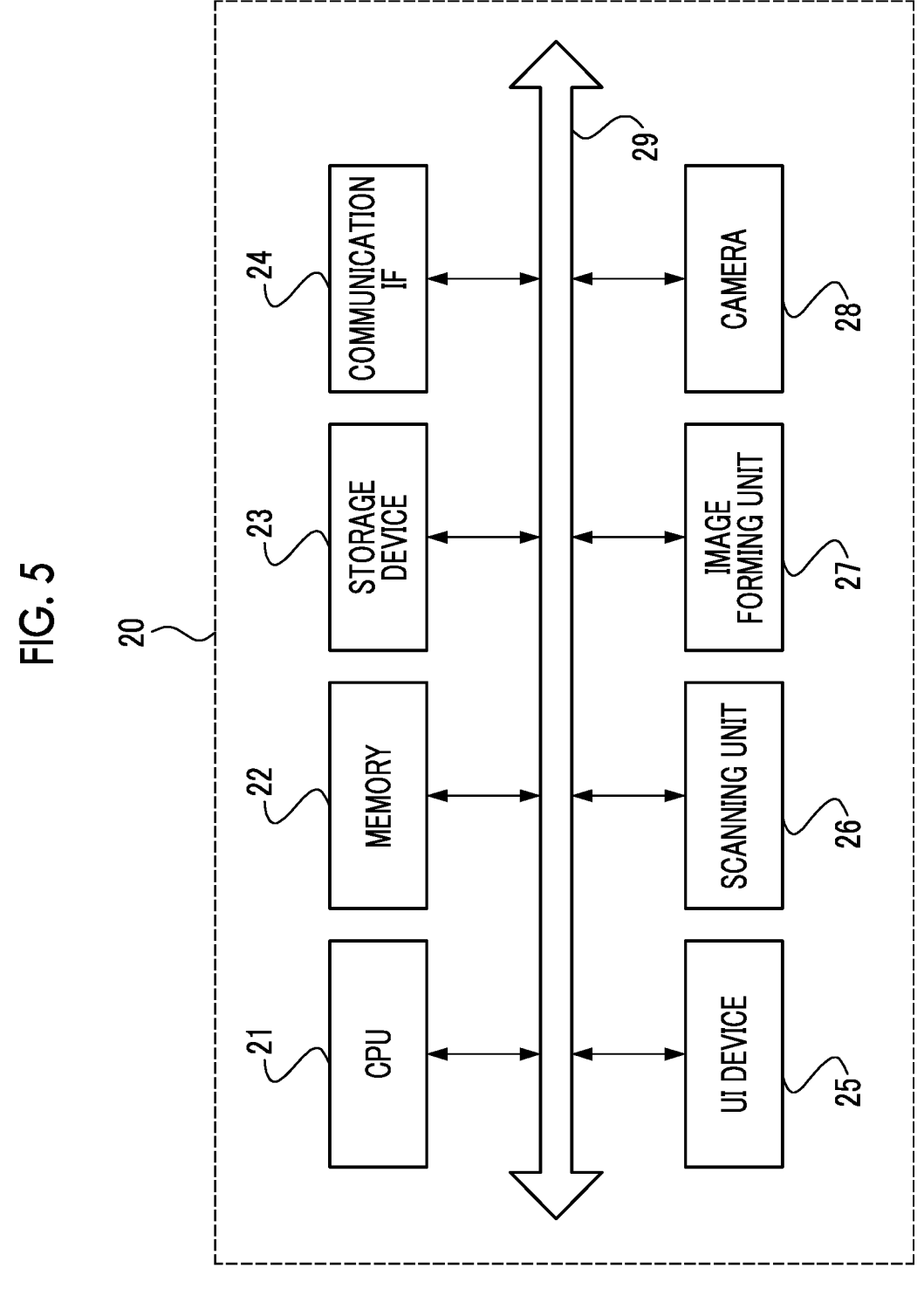
FIG. 5 is a block diagram illustrating a hardware configuration of an image forming apparatus 20 in the exemplary embodiment of the present disclosure.

Next, a hardware configuration of the image forming apparatus 20 in the image forming system of the present exemplary embodiment is illustrated in FIG. 5.

As illustrated in FIG. 5, the image forming apparatus 20 includes a CPU 21, a memory 22, a storage device 23 such as a hard disk drive, a communication interface (abbreviated to IF) 24 that transmits and receives data to and from an external apparatus or the like via the Internet 30, a user interface (abbreviated to UI) device 25 including a touch panel or a liquid crystal display and a keyboard, a scanning unit 26, an image forming unit 27, and the camera 28. These constituents are connected to each other via a control bus 29.

The image forming unit 27 prints an image on a recording medium such as a printing paper sheet through steps of electrostatic charging, exposure, development, transfer, fixing, and the like.

The CPU 21 is a processor that controls an operation of the image forming apparatus 20 by executing a predetermined process based on a control program stored in the memory 22 or the storage device 23. In the present exemplary embodiment, while the CPU 21 scans and executes the control program stored in the memory 22 or the storage device 23, the present disclosure is not limited thereto. The control program may be provided in the form of a recording on a computer readable recording medium. For example, this program may be provided in the form of a recording on an optical disc such as a compact disc (CD)-ROM and a digital versatile disc (DVD)-ROM or in the form of a recording on a semiconductor memory such as a universal serial bus (USB) memory and a memory card. In addition, the control program may be acquired from an external apparatus via a communication line connected to the communication interface 24.

Figure 6:
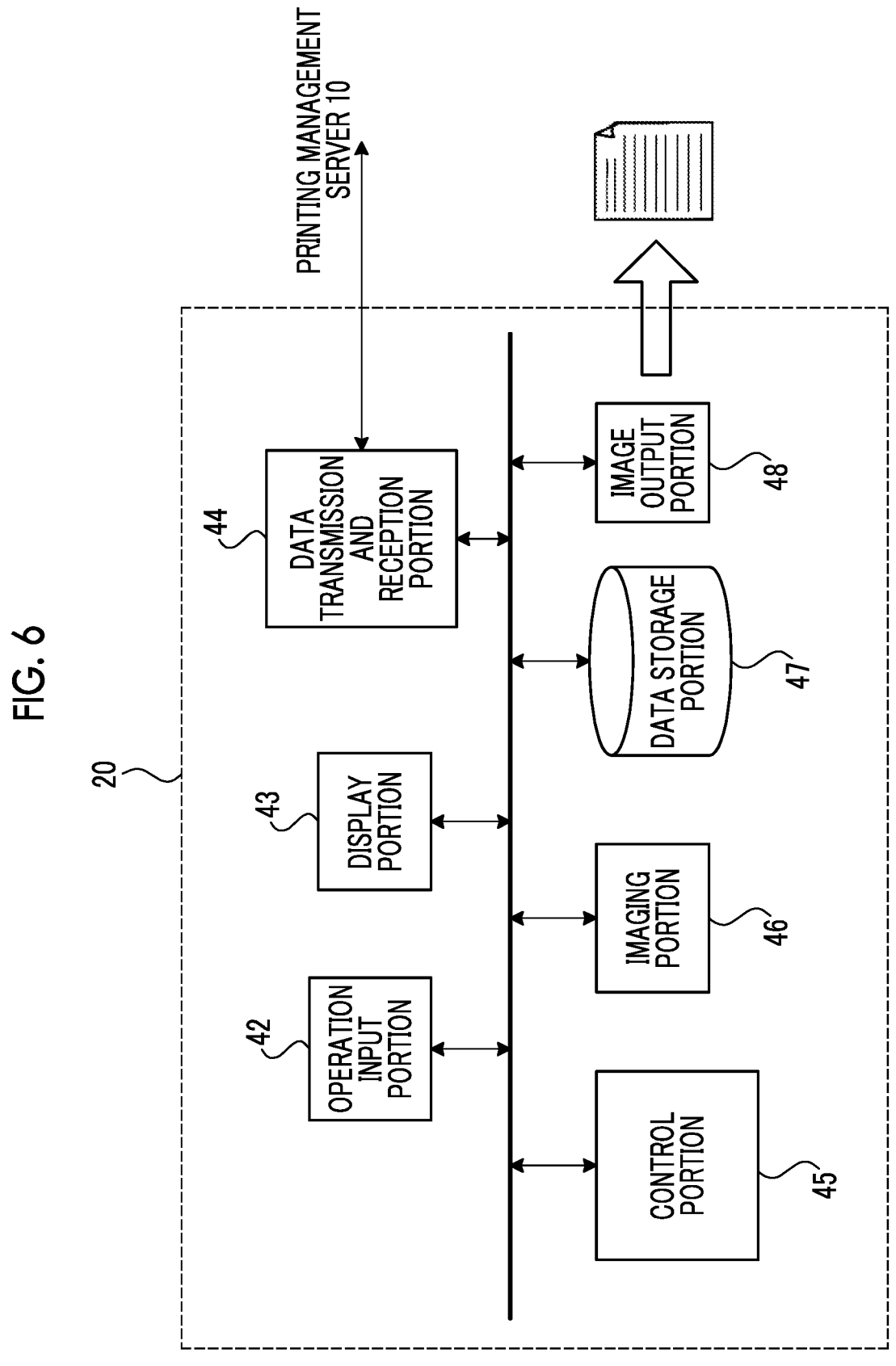
FIG. 6 is a block diagram illustrating a functional configuration of the image forming apparatus 20 in the exemplary embodiment of the present disclosure.

FIG. 6 is a block diagram illustrating a functional configuration of the image forming apparatus 20 implemented by executing the control program.

As illustrated in FIG. 6, the image forming apparatus 20 of the present exemplary embodiment includes an operation input portion 42, a display portion 43, a data transmission and reception portion 44, a control portion 45, an imaging portion 46, a data storage portion 47, and an image output portion 48.

The data transmission and reception portion 44 transmits and receives data to and from an external apparatus such as the printing management server 10 via the Internet 30. The display portion 43 is controlled by the control portion 45 and displays various information to the user. The operation input portion 42 inputs information about various operations performed by the user. The image output portion 48 outputs the image onto the recording medium such as a printing paper sheet under control of the control portion 45.

The control portion 45 converts the printing data downloaded from the printing management server 10 via the data transmission and reception portion 44 into image data of a raster form and stores the image data in the data storage portion 47. In a case where a printing instruction from the user is received from the operation input portion 42, the control portion 45 executes a process of outputting the image by controlling the image output portion 48 based on the image data of a raster form stored in the data storage portion 47.

The imaging portion 46 captures and acquires the face image of the user approaching the image forming apparatus 20.

First, in the present exemplary embodiment, for example, the user who wants to perform network printing registers the printing data in advance in the printing management server 10 from the terminal device 50 at home. In a case where the user registers the printing data in the printing management server 10, a network printing ID for specifying the user in performing network printing is associated with a cashierless payment ID for specifying the user in using the cashierless payment system.

Furthermore, the cashierless payment server 40 is set to notify the printing management server 10 of the cashierless payment ID of the user who has entered and information about the entered store in a case where entry of a user to any store is detected.

In addition, the cashierless payment server 40 is notified of information about a price of printing by performing network printing for the user from the printing management server 10, and the payment process of the price of the printing process for the user is performed using the same method as the purchase of the product in the cashierless payment system.

In a case where a notification indicating that a user has entered a store in which authentication of the user is necessary at entry is received from the cashierless payment server 40, the control portion 34 in the printing management server 10 transmits the printing data registered in advance by the user who has entered the store to the image forming apparatus 20 installed in the store.

In a case where the printing data transmitted from the printing management server 10 is received, the control portion 45 in the image forming apparatus 20 converts the received printing data into a raster form that is a printable form and stores the converted printing data in the data storage portion 47 as printable data.

The present exemplary embodiment is described using a case where one image forming apparatus 20 is installed in the store that is a convenience store. However, in a case where a plurality of the image forming apparatuses 20 are installed in the store, the printing data is transmitted to all image forming apparatuses 20 installed in the store.

The control portion 45 starts printing the printable data of the user stored in the data storage portion 47 in accordance with the printing start instruction from the user who has entered the store.

Figure 7:
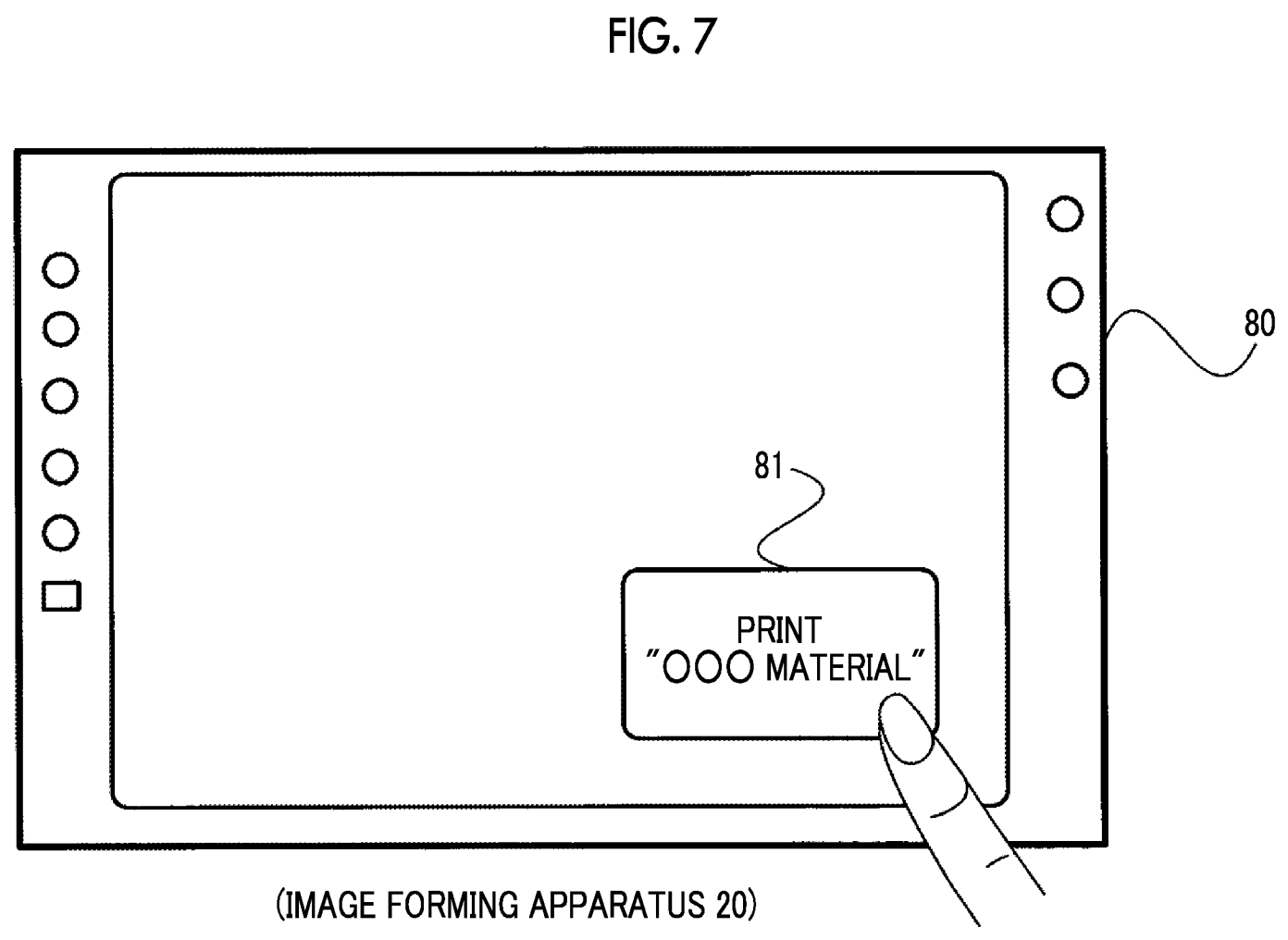

Specifically, the control portion 45 starts printing the printable data of the user in a case where a start button for providing an instruction to start printing the printable data of the user stored in the data storage portion 47 is operated. For example, the control portion 45 displays a printing start button on the display portion 43 and starts the printing process in a case where an operation of the printing start button by the user is input from the operation input portion 42. An example of a case where the display portion 43 and the operation input portion 42 are configured with a touch panel is illustrated in FIG. 7. In the example illustrated in FIG. 7, a state where a printing start button 81 is displayed on an operation panel 80 of the image forming apparatus 20 and the user operates the printing start button 81 is illustrated.

The control portion 45 does not start printing the printable data of the user until the printing start button for starting printing of the printable data of the user stored in the data storage portion 47 is operated.

However, in a case where the printing process is started based on the operation of the printing start button, there is a possibility that after a user enters the store, the printing process is started by simply operating the printing start button by another user.

Therefore, in a case where the user registers the printing data in the printing management server 10 from the terminal device 50, an authentication face image such as a face photo of the user may be registered, and the control portion 34 of the printing management server 10 may transmit the authentication face image of the user recognized as having entered the store to the image forming apparatus 20 in association with the printing data registered by the user.

In this case, the control portion 45 of the image forming apparatus 20 captures the face image of the user who has approached the image forming apparatus 20 using the imaging portion 46 provided in the image forming apparatus 20 and does not permit the start of the printing of the printable data associated with the authentication face image in a case where the captured face image does not match the authentication face image.

By performing such a control, the printing process is not started even in a case where another user different from the user who has entered operates the printing start button displayed on the operation panel 80 of the image forming apparatus 20.

Furthermore, even in the above case, the operation of the printing start button is necessary for starting the printing process. However, eliminating the operation of the user as much as possible is required for the cashierless store.

Therefore, in the same manner as the above control, the control portion 34 of the printing management server 10 transmits the authentication face image of the user recognized as having entered the store to the image forming apparatus 20 in association with the printing data registered by the user. The control portion 45 of the image forming apparatus 20 may capture the face image of the user who has approached the image forming apparatus 20 using the imaging portion 46 provided in the image forming apparatus 20 and start printing the printable data of the user without a need for the operation of the printing start button in a case where the captured face image matches the authentication face image.

By performing such a control, the printing process is started in a case where the user enters the store in which the image forming apparatus 20 is installed and the user approaches the image forming apparatus 20 and stands in front of the image forming apparatus 20. That is, the user who has registered the printing data in the printing management server 10 can acquire the printed matter by simply searching for and entering a nearby convenience store and approaching the image forming apparatus 20 installed in the store. The price of the printing process is paid by the cashierless payment system in a case where the user who has picked up the acquired printed matter simply leaves the store.

There is also a possibility that a plurality of users who have registered the printing data in the printing management server 10 enter the store that is a convenience store. In this case, a plurality of pieces of printable data are stored in the data storage portion 47. In a case where a plurality of pieces of printable data are present in the data storage portion 47, the control portion 45 executes the printing process by specifying printable data associated with the authentication face image matching the face image captured by the imaging portion 46 as data to be printed.

Furthermore, even in a case where the user who has registered the printing data in the printing management server 10 enters the convenience store and the printing data is downloaded to the image forming apparatus 20 installed in the store, a case where the user leaves without performing printing is also considered. In this case, in a case where the printing data remains in the image forming apparatus 20, unnecessary printing data remains at all times, and a storage capacity of the image forming apparatus 20 is unnecessarily consumed. Particularly, in a case where the printing data is converted into printable data of a raster form, a data amount is increased. Thus, the storage capacity of the image forming apparatus 20 is reduced.

Thus, in a case where a notification indicating that a user has left the store is received from the cashierless payment server 40, the control portion 34 of the printing management server 10 may instruct the image forming apparatus 20 to delete the printable data of the user.

In this case, in a case where a notification indicating that the user who has downloaded the printing data has left is received from the printing management server 10, the control portion 45 of the image forming apparatus 20 deletes the printable data of the user from the data storage portion 47.

In a case where the printing process is completed in the image forming apparatus 20, a notification indicating that printing is completed is transmitted to the control portion 34 of the printing management server 10 from the control portion 45 of the image forming apparatus 20. The control portion 34 that receives the notification indicating that printing is completed transmits the fee of printing and information about the user who has performed printing to the cashierless payment server 40. Consequently, the fee of printing is billed to the user via the cashierless payment system.

Figure 8:
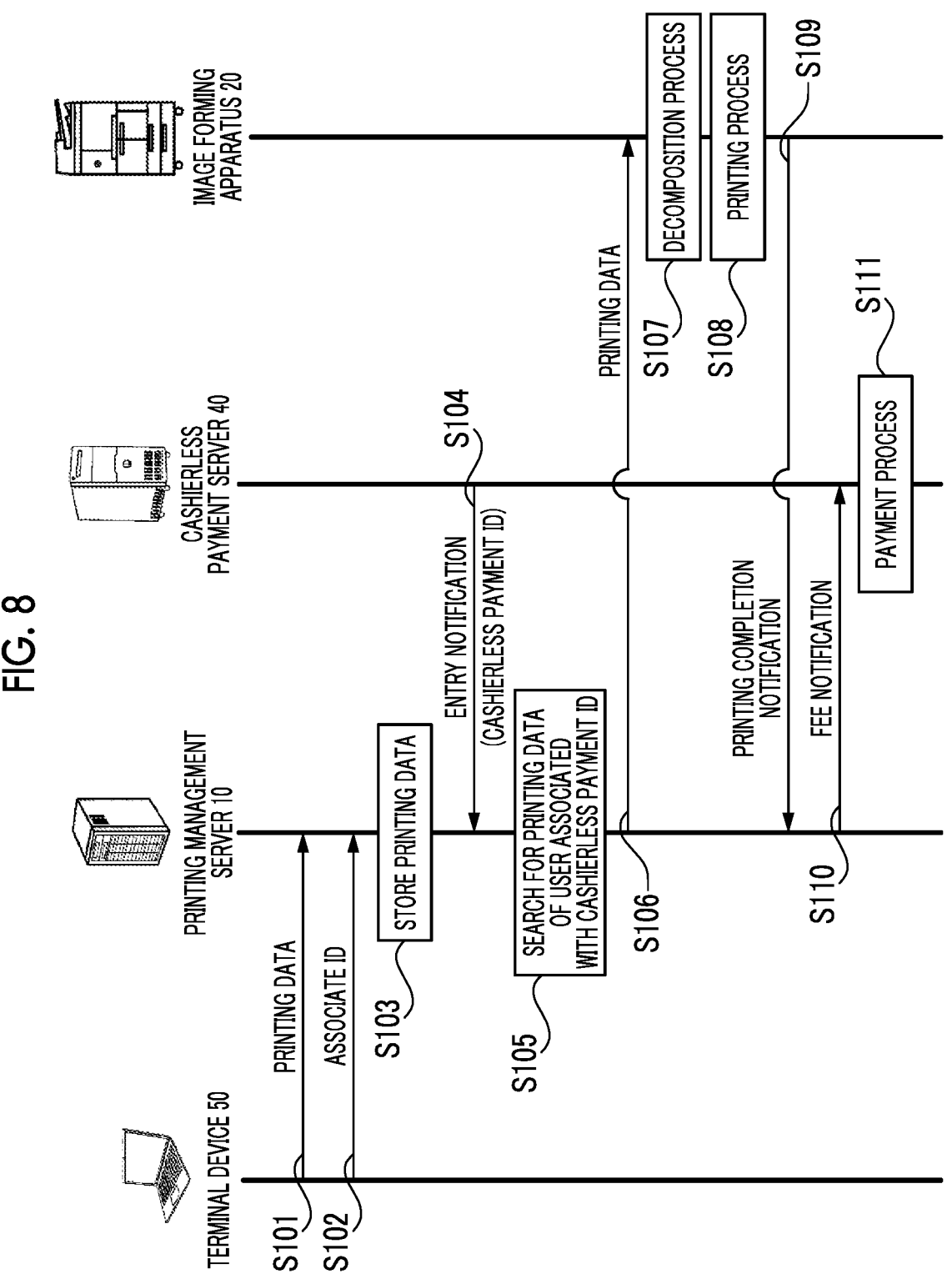
FIG. 8 is a sequence chart for describing a state of transmission and reception of data among a terminal device 50, the printing management server 10, a cashierless payment server 40, and the image forming apparatus 20.

Next, a state of transmission and reception of data among the terminal device 50, the printing management server 10, the cashierless payment server 40, and the image forming apparatus 20 described above will be described with reference to the sequence chart in FIG. 8.

First, in the terminal device 50, in step S101, the printing data is registered in the printing management server 10. In this case, in the terminal device 50, a network printing ID and a cashierless payment ID of the user who has registered the printing data are associated with each other in step S102.

Then, in the printing management server 10, in step S103, the printing data is stored in association with the two IDs of the network printing ID and the cashierless payment ID.

In a case where the user who has registered the printing data enters any store in which the image forming apparatus 20 is installed by passing through the entry gate apparatus 61, the cashierless payment server 40 is notified of this entry. Then, in step S104, the cashierless payment server 40 transmits an entry notification including a cashierless payment ID of the user who has entered a store and information about the store entered by the user to the printing management server 10.

Then, in the printing management server 10, in step S105, a search for the printing data of the user having the network printing ID associated with the cashierless payment ID included in the entry notification is performed. In step S106, the printing management server 10 transmits the printing data specified in the search to the image forming apparatus 20 installed in the store entered by the user.

In step S107, the image forming apparatus 20 that receives the printing data converts the received printing data into printable data of a raster form by executing a decomposition process on the received printing data and stores the printable data.

Then, in the image forming apparatus 20, in step S108, the printing process is executed by detecting the operation of the printing start button and the approach of the user based on face authentication. In a case where the printing process is completed, the image forming apparatus 20 notifies the printing management server 10 that the printing process is completed in step S109.

In the printing management server 10 that receives a printing completion notification from the image forming apparatus 20, in step S110, information including information about the fee of the printing process and the cashierless payment ID of the user is transmitted to the cashierless payment server 40.

Then, in the cashierless payment server 40, in step S111, the payment process of the fee of the printing process is performed using the same method as a method of paying a price in a case of purchasing another product.

For example, the portable terminal device 70 of the user who has left the convenience store is notified of a result of the payment process performed by the cashierless payment system. As an example, a notification example of a payment process result for the user who has purchased another product together with the printing process is illustrated in FIG. 9.

In FIG. 9, notifying the user of payment of a fee "40 yen for two printed sheets" as the fee of the printing process together with the price of the purchase of another product is perceived.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Modification Example

While the exemplary embodiment is described using a case where an image forming apparatus is installed in a cashierless store in which user authentication is necessary at entry and a user enters the store, the present disclosure is not limited thereto and can also be applied to a case where an image forming apparatus is installed in a region in which user authentication is necessary at entry and a user enters the region.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
   a cashierless payment server;
   a printing management apparatus including a first processor configured to:
      in a case where a notification indicating that a user enters a region in which authentication of the user is necessary at entry is received from the cashierless payment server, transmit printing data registered in advance by the user who has entered the region to an image forming apparatus installed in the region, wherein the cashierless payment server is configured to perform a payment process based on a credit card number registered in advance by the user; and
   at least one image forming apparatus including a second processor and a memory, the second processor being configured to:
      receive the printing data transmitted from the printing management apparatus;
      convert the printing data into a printable form; and
      store the converted printing data in the memory as printable data.

2. The image forming system according to claim 1, wherein the second processor is configured to:
   start printing the printable data of the user stored in the memory in accordance with a printing start instruction from the user.

3. The image forming system according to claim 1, wherein the second processor is configured to:
   start printing the printable data of the user in a case where a start button for starting the printing of the printable data of the user stored in the memory is operated.

4. The image forming system according to claim 2, wherein the second processor is configured to:
   not to start printing the printable data of the user until a start button for starting printing of the printable data of the user stored in the memory is operated.

5. The image forming system according to claim 3, wherein the first processor is configured to:
   transmit an authentication face image of the user recognized as having entered the region to the image forming apparatus in association with the printing data, and
   the second processor is configured to:
      capture a face image of the user who has approached the image forming apparatus using an imaging portion provided in the image forming apparatus and, in a case where the captured face image does not match the authentication face image, not permit the start of the printing of the printable data associated with the authentication face image.

6. The image forming system according to claim 4, wherein the first processor is configured to:
   transmit an authentication face image of the user recognized as having entered the region to the image forming apparatus in association with the printing data, and
   the second processor is configured to:
      capture a face image of the user who has approached the image forming apparatus using an imaging portion provided in the image forming apparatus and, in a case where the captured face image does not match the authentication face image, not permit the start of the printing of the printable data associated with the authentication face image.

7. The image forming system according to claim 1, wherein the first processor is configured to:

transmit an authentication face image of the user recognized as having entered the region to the image forming apparatus in association with the printing data, and the second processor is configured to:

capture a face image of the user who has approached the image forming apparatus using an imaging portion provided in the image forming apparatus and, in a case where the captured face image matches the authentication face image, start printing the printable data of the user.

8. The image forming system according to claim 7, wherein the second processor is configured to:

in a case where a plurality of pieces of printable data are present, specify printable data associated with the authentication face image matching the captured face image as data to be printed.

9. The image forming system according to claim 1, wherein the first processor is configured to:

instruct the image forming apparatus to delete the printable data of the user in a case where a notification indicating that the user has left the region is received, and the second processor is configured to:

delete the printable data of the user from the memory.

10. The image forming system according to claim 2, wherein the first processor is configured to:

instruct the image forming apparatus to delete the printable data of the user in a case where a notification indicating that the user has left the region is received, and the second processor is configured to:

delete the printable data of the user from the memory.

11. The image forming system according to claim 3, wherein the first processor is configured to:

instruct the image forming apparatus to delete the printable data of the user in a case where a notification indicating that the user has left the region is received, and the second processor is configured to:

delete the printable data of the user from the memory.

12. The image forming system according to claim 4, wherein the first processor is configured to:

instruct the image forming apparatus to delete the printable data of the user in a case where a notification indicating that the user has left the region is received, and the second processor is configured to:

delete the printable data of the user from the memory.

13. The image forming system according to claim 5, wherein the first processor is configured to:

instruct the image forming apparatus to delete the printable data of the user in a case where a notification indicating that the user has left the region is received, and the second processor is configured to:

delete the printable data of the user from the memory.

14. The image forming system according to claim 6, wherein the first processor is configured to:

instruct the image forming apparatus to delete the printable data of the user in a case where a notification indicating that the user has left the region is received, and the second processor is configured to:

delete the printable data of the user from the memory.

15. The image forming system according to claim 7, wherein the first processor is configured to:

instruct the image forming apparatus to delete the printable data of the user in a case where a notification indicating that the user has left the region is received, and the second processor is configured to:

delete the printable data of the user from the memory.

16. The image forming system according to claim 8, wherein the first processor is configured to:

instruct the image forming apparatus to delete the printable data of the user in a case where a notification indicating that the user has left the region is received, and the second processor is configured to:

delete the printable data of the user from the memory.

17. A printing management apparatus comprising:

a processor configured to:

in a case where a notification indicating that a user enters a region in which authentication of the user is necessary at entry is received from a cashierless payment server, transmit printing data registered in advance by the user who has entered the region to an image forming apparatus installed in the region and an authentication face image of the user recognized as having entered the region to the image forming apparatus in association with the printing data, wherein the authentication face image is used in an authentication process for printing the printing data that has been converted into a printable form, wherein the cashierless payment server is configured to perform a payment process based on a credit card number registered in advance by the user.

18. A non-transitory computer readable medium storing a program causing a computer constituting a printing management apparatus to execute a process comprising:

receiving, from a cashierless payment server, in a case where a notification indicating that a user enters a region in which authentication of the user is necessary at entry;

transmitting, in a case where the notification is received, printing data registered in advance by the user who has entered the region to an image forming apparatus installed in the region and an authentication face image of the user recognized as having entered the region to the image forming apparatus in association with the printing data, wherein the authentication face image is used in an authentication process for printing the printing data that has been converted into a printable form, wherein the cashierless payment server is configured to perform a payment process based on a credit card number registered in advance by the user.

* * * * *